(12) United States Patent
Choi et al.

(10) Patent No.: US 11,519,580 B1
(45) Date of Patent: Dec. 6, 2022

(54) LIGHTING DEVICE FOR VEHICLE

(71) Applicant: HYUNDAI MOBIS CO., LTD., Seoul (KR)

(72) Inventors: Ban Suk Choi, Yongin-si (KR); Seung Woo Baek, Yongin-si (KR); Hyoung Jin Choi, Yongin-si (KR); Jun Hyuk Cha, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/569,854

(22) Filed: Jan. 6, 2022

(30) Foreign Application Priority Data

Aug. 19, 2021 (KR) .......................... 10-2021-0109190

(51) Int. Cl.
| | |
|---|---|
| *F21V 1/16* | (2018.01) |
| *F21S 41/40* | (2018.01) |
| *F21S 41/25* | (2018.01) |

(52) U.S. Cl.
CPC ............... *F21S 41/40* (2018.01); *F21S 41/25* (2018.01)

(58) Field of Classification Search
None
See application file for complete search history.

(56) References Cited

U.S. PATENT DOCUMENTS

| | | | | |
|---|---|---|---|---|
| 10,845,019 | B2 * | 11/2020 | Doha | ........................ B60Q 1/14 |
| 2011/0148149 | A1 | 6/2011 | Hayashi et al. | |
| 2015/0003090 | A1 * | 1/2015 | Mugge | ..................... F21S 43/14 |
| | | | | 362/509 |
| 2019/0368682 | A1 * | 12/2019 | Suzuki | .................. F21S 41/285 |

FOREIGN PATENT DOCUMENTS

| | | |
|---|---|---|
| DE | 20115801 U1 | 3/2002 |
| KR | 1020130081352 A | 7/2013 |
| WO | 2017066818 A1 | 4/2017 |

OTHER PUBLICATIONS

Office Action dated Apr. 12, 2022 in corresponding German Patent Application No. 102021006211.6.

* cited by examiner

*Primary Examiner* — Elmito Breval
(74) *Attorney, Agent, or Firm* — NovoTechIP International PLLC

(57) ABSTRACT

A lighting device for a vehicle may include: a housing mounted on a vehicle body; one or more light sources mounted in the housing, and configured to emit light; and a screen having 3D surfaces corresponding to the number of the light sources, and configured to generate a 3D lighting by transmitting the light emitted from the light sources.

9 Claims, 5 Drawing Sheets

1

LIGHTING DEVICE FOR VEHICLE

CROSS-REFERENCE TO RELATED APPLICATION

This application claims priority from and the benefit of Korean Patent Application No. 10-2021-0109190, filed on Aug. 19, 2021, which is hereby incorporated by reference for all purposes as if set forth herein.

BACKGROUND

Field

Exemplary embodiments of the present disclosure relate to a lighting device for a vehicle, and more particularly, to a lighting device for a vehicle, which can generate lighting on a 3D surface, thereby improving the degree of freedom in design of a vehicle body.

Discussion of the Background

A vehicle includes a plurality of lamps which perform a lighting function of illuminating a target such that the target becomes noticeable during night driving, and a signal and information providing function of notifying a condition of an ego vehicle to a driver of the ego vehicle, a pedestrian or a driver of another vehicle, the condition of the ego vehicle including a driving condition, operation condition, driving direction and other various vehicle conditions.

Recently, the application of an LED (Light Emitting Diode) lamp as a vehicle lamp instead of an incandescent lamp has gradually increased. The LED lamp uses an LED as a light source because the LED can make the eyes less tired than the incandescent lamp and reduce the size of the lamp to increase the degree of freedom in design.

The LED lamp exhibits excellent visibility and stability in that the LED lamp has a longer lifetime, smaller power consumption and higher lighting speed than the existing incandescent lamp. The LED lamp basically includes an LED module serving as a light source, a reflector configured to set the direction of light emitted from the LED module, and a lens disposed in front of the LED module and configured to transmit light.

The conventional vehicle lamp is only manufactured focusing on the lighting function, and is still inadequate to have an aesthetic function of beautifully expressing or emitting light in a specific shape. Thus, the conventional vehicle lamp does not significantly contribute to improving the design or merchantability of the vehicle.

Recently, a vehicle lamp is designed to occupy a large area in a vehicle in consideration of the design of the vehicle, and it is prescribed in the regulations that the vehicle lamp has a light emission area. In the LED lamp, however, the individual LEDs serving as light sources have a narrow emission angle. Thus, a large number of LEDs are required to fill the emission area of the lamp.

Recently, high-performance LEDs have been developed. However, when a lamp capable of emitting light across a wide area is requested in terms of design, the lamp needs to be mainly designed to have a number of LEDs mounted therein. In this case, the manufacturing cost of the lamp is inevitably increased.

Furthermore, since the conventional LED lamp for a vehicle has a structure in which flat and thin lenses with a simple structure are simply put on the front surface of the LED arrangement, the lamp gives people an uninspiring feeling. Therefore, there is a need for a device capable of solving the problem.

The related art of the present disclosure is disclosed in Korean Patent Application Publication No. 2013-0081352 published on Jul. 17, 2013 and entitled "Vehicle Lamp".

SUMMARY

Various embodiments are directed to a lighting device for a vehicle, which can implement lighting on a 3D surface, thereby improving the degree of freedom in design of a vehicle body.

In an embodiment, a lighting device for a vehicle may include: a housing mounted on a vehicle body; one or more light sources mounted in the housing, and configured to emit light; and a screen having 3D surfaces corresponding to the number of the light sources, and configured to implement a 3D lighting by transmitting the light emitted from the light sources.

The housing may be disposed on a front surface of a vehicle body.

The housing may be embedded in a vehicle body, and the screen may be exposed to the outside while covering the open front area of the housing.

The light source may include: a light source case mounted in the housing; a light source lamp mounted in the light source case, and configured to emit light onto the 3D surfaces when power is applied thereto; one or more light source lenses mounted on the light source case, and configured to induce the light emitted from the light source lamp; and a light source sheet mounted on the light source case, and configured to adjust the pattern of light emitted from the light source lamp.

The light source sheet may be replaceable.

The light source sheet may include: a sheet base part inserted into the light source case; and a sheet transmission part formed in the sheet base part, and configured to form a pattern by transmitting light.

When two light source lenses are installed, the sheet base part may be disposed between the light source lenses.

The screen may include: a first transmission part configured to implement a first lighting by transmitting light emitted from any one of the light sources; and a second transmission part connected to the first transmission part, and configured to implement a second lighting by transmitting light emitted from another of the light sources.

The first and second transmission parts may be integrated with each other.

The first and second lightings may be connected to each other.

In the lighting device for a vehicle in accordance with the embodiment of the present disclosure, the light emitted from the light source reaches the screen forming the 3D surface and implements the 3D lighting, which makes it possible to improve the degree of freedom in design of the vehicle body.

DETAILED DESCRIPTION OF THE ILLUSTRATED EMBODIMENTS

Hereinafter, a lighting device for a vehicle will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
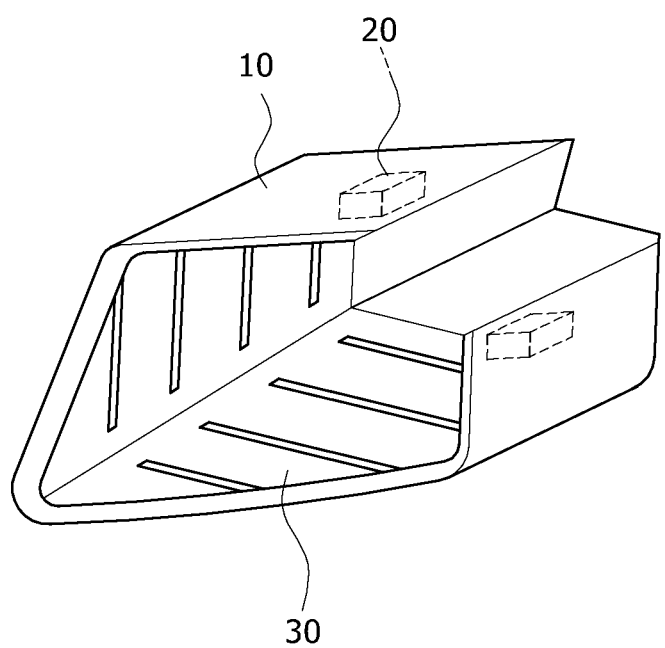
FIG. 1 is a diagram schematically illustrating a lighting device for a vehicle in accordance with an embodiment of the present disclosure.
Figure 2:
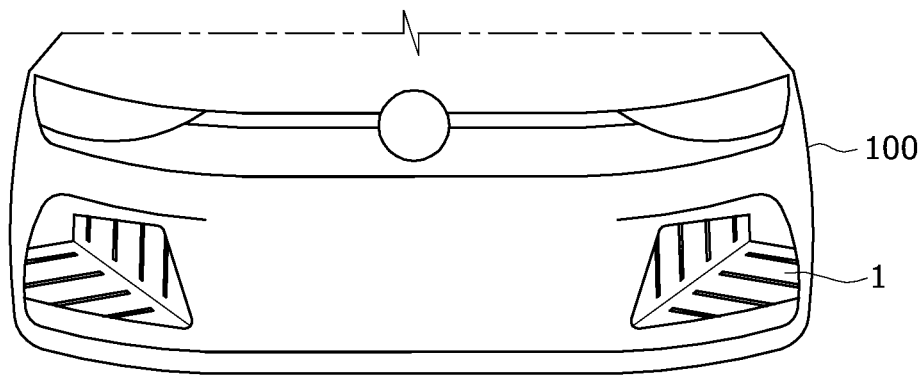
FIG. 2 is a diagram schematically illustrating that the lighting device for a vehicle in accordance with the embodiment of the present disclosure.

FIG. 1 is a diagram schematically illustrating a lighting device for a vehicle in accordance with an embodiment of the present disclosure, and FIG. 2 is a diagram schematically illustrating that the lighting device for a vehicle in accordance with the embodiment of the present disclosure. Referring to FIGS. 1 and 2, a lighting device 1 for a vehicle in accordance with an embodiment of the present disclosure includes a housing 10, a light source 20 and a screen 30.

The housing 10 is mounted on a vehicle body 100. For example, the housing 10 may be formed to have an open front surface, and fixed to the vehicle body 100.

One or more light sources 20 are mounted in the housing 10, and serve to emit light. For example, two light sources 20 may be mounted in one housing 10.

The screen 30 has three-dimensional (3D) surfaces corresponding to the number of the light sources 20, and generates a 3D lighting by transmitting light emitted from the light sources 20. For example, the screen 30 may cover the open area of the housing 10.

The housing 10, the light sources 20 and the screen 30 may be assembled as one module. The housing 10 is positioned at the front surface of the vehicle body 100. For example, the housing 10 may be applied to an electrical vehicle and an internal combustion engine vehicle, and positioned at fog light areas corresponding to the left and right sides of a radiator grill area of the vehicle body 100. At this time, the housing 10 may be mounted and embedded in the vehicle body 100, and the screen 30 may be exposed externally from the housing 10. The light source 20 may be assembled to the housing 10, and replaced, if necessary.

Figure 3:
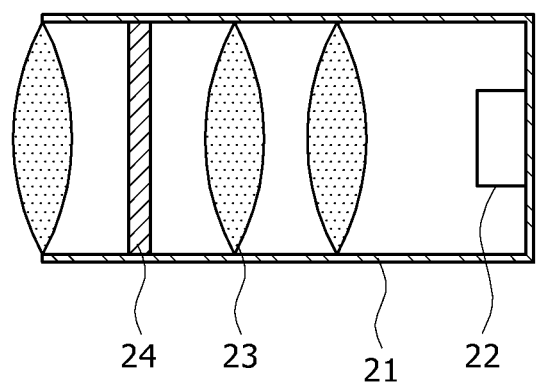
FIG. 3 is a diagram schematically illustrating a light source in accordance with the embodiment of the present disclosure.

FIG. 3 is a diagram schematically illustrating the light source in accordance with the embodiment of the present disclosure. Referring to FIG. 3, the light source 20 in accordance with the embodiment of the present disclosure includes a light source case 21, a light source lamp 22, a light source lens 23 and a light source sheet 24.

The light source case 21 is mounted in the housing 10. For example, the light source case 21 is attached to/detached from the housing 10. The light source case 21 may have an open front surface. At this time, the inner surface of the light source case 21 may be coated with a material for reflecting light, and induce light to the open area.

The light source lamp 22 is mounted in the housing 10. For example, the light source lamp 22 may include a lamp and board for controlling the luminous intensity and turn on/off of the light source 20, and an LED may be used as the lamp. The light source lamp 22 may emit light toward the front surface of the light source case 21 when power is applied thereto.

One or more light lenses 23 may be mounted on the light source case 21, and induce light emitted from the light source lamp 22. For example, the light source lens 23 may diffuse or align the light, thereby improving the straightness of the light.

The light source sheet 24 is mounted on the light source case 21, and adjusts the light pattern of the light emitted from the light source lamp 22. For example, the light source sheet 24 may have a unique light pattern formed thereon. If necessary, the light source sheet 24 may be replaced to install another light source sheet in the light source case 21, in order to generate various light patterns.

Figure 4:
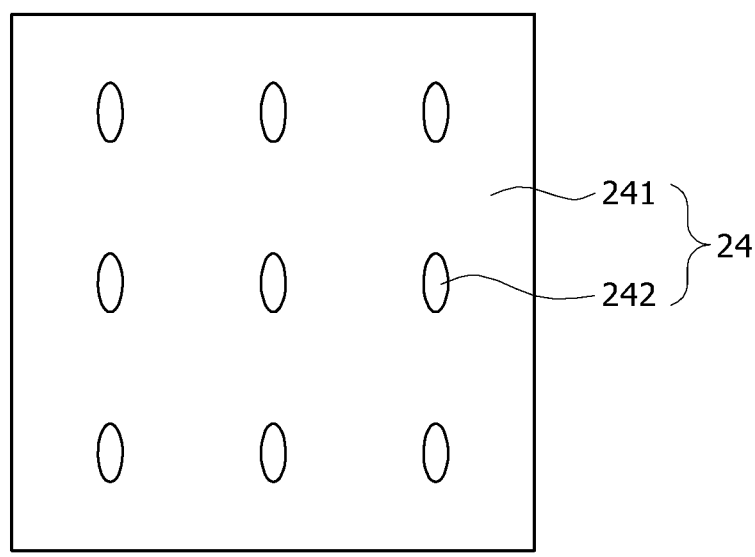
FIG. 4 is a diagram schematically illustrating a light source sheet in accordance with the embodiment of the present disclosure.

FIG. 4 is a diagram schematically illustrating the light source sheet in accordance with the embodiment of the present disclosure. Referring to FIG. 4, the light source sheet 24 in accordance with the embodiment of the present disclosure includes a sheet base part 241 and a sheet transmission part 242.

The sheet base part 241 is inserted into the light source case 21. For example, the sheet base part 241 may be positioned between the light source lens 23 and the light source lamp 22, and replaced to install another sheet base in the light source case 21, if necessary. The sheet base part 241 may be made of a material for interrupting light, and the edge thereof may be assembled to the light source case 21. When two light source lenses 23 are installed, the two light source lenses 23 may be spaced apart from each other, and the sheet base part 241 may be positioned between the light source lenses 23 spaced apart from each other. In addition, when three or more light source lenses 23 are installed, the sheet base part 241 may be positioned in any one or each of the spaces between the respective light source lenses 23.

The sheet base part 241 has sheet transmission parts 242 formed therein and configured to form a pattern by transmitting light. For example, the sheet transmission part 242 may have a hole shape formed in the sheet base part 241. The illuminance of the lighting may be adjusted according to the size or transmittance of the sheet transmission part 242.

Figure 5:
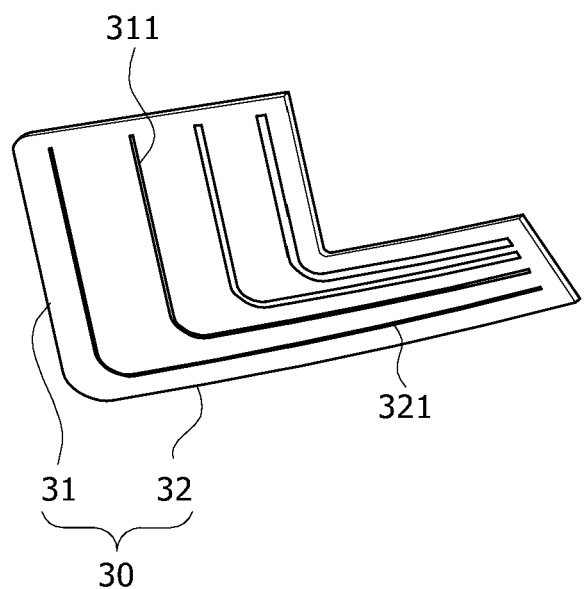
FIG. 5 is a diagram schematically illustrating a screen in accordance with the embodiment of the present disclosure.

FIG. 5 is a diagram schematically illustrating the screen in accordance with the embodiment of the present disclosure. Referring to FIG. 5, the screen 30 in accordance with the embodiment of the present disclosure includes a first transmission part 31 and a second transmission part 32. The first and second transmission parts 31 and 32 may be connected to each other to form a 3D surface.

The first transmission part 31 generates a first lighting 311 by transmitting light emitted from any one of the light sources 20. For example, the pattern generated by the light source sheet 24 may reach the first transmission part 31 and form the first lighting 311.

The second transmission part 32 is connected to the first transmission part 31, and generates a second lighting 321 by transmitting light emitted from the other of the light sources 20. For example, the pattern generated by the light source sheet 24 may reach the second transmission part 32 and form the second lighting 321.

When the screen 30 includes the first and second transmission parts 31 and 32 to form the 3D surface, the first and second transmission parts 31 and 32 may be assembled or integrated with each other to maintain the connection therebetween. The connection between the first and second transmission parts 31 and 32 may have an angular shape or form a curved surface.

The first and second lightings 311 and 321 may be connected to each other. More specifically, the light emitted from any one light source 20 may form the first lighting 311 at the first transmission part 31, and the light emitted from the other light source 20 may form the second lighting 321 at the second transmission part 32. At this time, the first lighting 311 may be generated up to an end of the first transmission part 31, and the second lighting 321 may be generated up to an end of the second transmission part 32. Thus, when the first and second transmission parts 31 and 32 are connected to each other, the first and second lightings 311 and 321 may be connected to each other. Therefore, although the screen 30 forms 3D surfaces, the 3D lightings corresponding to the 3D surfaces may be generated.

Hereafter, an assembling process and an operation of the lighting device for a vehicle in accordance with the embodiment of the present disclosure, which has the above-described structure, will be described as follows.

The light sources 20 are mounted in the housing 10, and the screen 30 having 3D surfaces corresponding to the number of the light sources 20 is mounted in the housing 10. The screen 30 covers the open area of the housing 10.

The lighting device 1 for a vehicle, which has been assembled as described above, is installed as a module on the front surface of the vehicle body 100. That is, the lighting device 1 for a vehicle is installed at the fog light area installed on each of the left and right sides of the radiator grill.

When the light sources 20 are turned on in the above-described state, light generated by the light sources 20 reaches the screen 30 to generate a 3D lighting.

That is, the 3D surface of the screen 30 includes the first transmission part 31 and the second transmission part 32 which are connected to each other. The first lighting 311 is formed on the first transmission part 31, and the second lighting 321 is formed on the second transmission part 32. The first and second lightings 311 and 321 are connected to each other.

The light source 20 includes the light source case 12, the light source lamp 22 mounted in the light source case 21 and configured to generate light, the light source lens 23 configured to induce light, and the light source sheet 24 configured to generate a light pattern. At this time, since the light source sheet 24 can be replaced, the light source sheet 24 having various light patterns may be applied according to a consumer's taste.

In the lighting device 1 for a vehicle in accordance with the embodiment of the present disclosure, the light emitted from the light source 20 reaches the screen 30 forming the 3D surface and generates the 3D lighting, which makes it possible to improve the degree of freedom in design of the vehicle body.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A three-dimensional (3D) lighting device for a vehicle, comprising:
   a housing coupled to a vehicle body;
   a plurality of light sources housed in the housing and configured to emit light, the plurality of light sources including first and second light sources configured to emit first and second lights, respectively; and
   a screen having a 3D surface configured to transmit the light emitted from the plurality of light sources to generate a 3D lighting, wherein the 3D surface comprises:
      a first transmission part configured to generate a first lighting based on the first light emitted from the first light source; and
      a second transmission part connected to the first transmission part and configured to generate a second lighting based on the second light emitted from the second light source, the 3D lighting comprising the first and second lightings.

2. The 3D lighting device of claim 1, wherein the housing is positioned on a front surface of a vehicle body.

3. The 3D lighting device of claim 1, wherein:
   the housing is embedded in the vehicle body and has an open front area, and
   the screen is exposed externally from the housing while covering the open front area of the housing.

4. The 3D lighting device of claim 1, wherein the light source comprises:
   a light source case positioned in the housing;
   a light source lamp positioned in the light source case and configured to emit the light onto the 3D surface;
   one or more light source lenses positioned on the light source case and configured to transmit the light emitted from the light source lamp; and
   a light source sheet positioned on the light source case and configured to adjust a light pattern of the light emitted from the light source lamp.

5. The 3D lighting device of claim 4, wherein the light source sheet is replaceable.

6. The 3D lighting device of claim 4, wherein the light source sheet comprises:
   a sheet base part inserted into the light source case; and
   a sheet transmission part formed in the sheet base part and configured to form the light pattern.

7. The 3D lighting device of claim 6, wherein:
   the one or more light source lenses comprises two light source lenses, and
   the sheet base part is positioned between the two light source lenses.

8. The 3D lighting device of claim 1, wherein the first and second transmission parts are integrally formed.

9. The 3D lighting device of claim 8, wherein the first and second lightings are connected to each other.

* * * * *